Sept. 25, 1951  H. M. DU B. DE BEAUMONT  2,568,793
VISCOSITY MEASURING MEANS
Filed March 1, 1945

INVENTOR:
Henry Martial du Boscq de Beaumont

By
his ATTY.

Patented Sept. 25, 1951

2,568,793

UNITED STATES PATENT OFFICE 2,568,793

VISCOSITY MEASURING MEANS

Henry Martial du Boscq de Beaumont, Civray-sur-Cher Via Francueil, France, assignor of one-half to Etablissements Edgar Brandt, Paris (Seine), France Application March 1, 1945, Serial No. 580,330
In France October 8, 1942

Section 1, Public Law 690, August 8, 1946
Patent expires October 8, 1962

6 Claims. (Cl. 73—60)

The present invention relates to a viscosimeter of great accuracy and it has for its object to devise a process for directly measuring absolute as well as relative viscosities of all liquids, under conditions similar to those prevailing in the machine elements (bearings, king pins, etc.) as to the pressures in use and the thicknesses of liquid interposed between the rigid surfaces in relative motion to each other, as well as under different thicknesses.

It is well known that viscosimeters based on this principle have not proved satisfactory, due to anomalies arising among others from a wrong interpretation of the operation of said viscosimeters.

The above mentioned anomalies have been studied by various scientists, in particular by the physician Amédée Guillet, who has recorded the essential points of his observations in two reports to the "Académie des Sciences," dated February 4 and April 2, 1935. These anomalies were attributed to an effect of turbulence, but it had been admitted heretofore that the movement of the liquid enclosed in a vessel in which a co-axial plunger was completely or partially immersed, the vessel and the plunger being imparted, relatively to each other, a uniform speed of rotation, was comparable to gradual displacements of the liquid in concentric layers in uniform rotation, which implied that the distribution of the pressures follows the laws of hydrostatics.

Now, it can be shown by a close and rigorous analysis of the phenomenon that such a hypothesis, implying (at least at slow speeds) a distribution of the pressures which would in practice very approximately follow the laws of hydrostatics, is completely inconsistent with reality.

Applicant has discovered that this hypothesis of concentric displacement at uniform speeds in concentric layers is unwarranted and that in fact one or more rings of eddies are set up, in which the whole liquid participates; applicant also discovered that such eddies take place even when the speeds imparted to the plunger are quite small, so that the measure of the viscosity must take into account not only the speeds normal to the meridian planes, which are given by classical formulae and were heretofore thought to be the only ones to be considered, but also the speed components contained in the meridian planes. In other words, applicant has found that the distribution of pressures in the midst of a liquid sustained in a uniform gyratory movement could never be compared, even approximately, to a pressure distribution following the laws of hydrostatics, however slow may be the speeds of rotation which bring about the said phenomenon.

In order that the principle and the scope of the invention, which is based on this discovery, should be clearly understood, it must be noted that this particular aspect of the distribution of pressures is implicitly denied in all documents concerned with this question, even by those who admit however that the laws of hydrostatics do not apply.

The particular turbulent or whirling state discovered by applicant, implying a meridian component of the speeds which geometrically combines with the component of the speeds normal to the meridian planes given by the classical formulae, is perfectly defined, and the distribution of said meridian components can be calculated for slow working speeds by classical mathematical methods, when the shapes of the vessel and of the plunger are simple figures, as would be for instance a system of concentric spheres, the interstitial space of which would be filled with liquid, or a hemi-spherical cup and a corresponding hemisphere immersed in the liquid contained therein.

The apparatus according to the invention for measuring viscosity therefore consists in means for interposing a body of viscous liquid between two surfaces, one at least of said surfaces being of revolution, having a uniform movement of rotation about the axis of revolution, and for measuring the effect of the positive or negative excess of pressure created in the midst of the fluid by said movement, either directly by a difference of pressure taken in the vicinity of two suitably chosen points unequally distant from the axis of rotation, or indirectly for measuring the thrust on one or the other of the opposed surfaces, or simultaneously on both surfaces.

The viscosimeter according to the invention comprises two solids one of them at least having a surface of revolution providing an interstice intended to receive a body of viscous liquid, means for imparting to one at least of the solids a uniform movement of rotation about the axis of revolution, and means for measuring the pressure effect created by the whirling movement of the viscous liquid.

According to a preferred embodiment of the invention, the means for measuring the pressure effect consists in a manometrical device responsive to the difference of pressures existing at two suitably chosen points of one of the surfaces of revolution, unequally distant from the axis of rotation.

According to another embodiment of the invention, the means for measuring the pressure effect consists in a dynamometric device responsive to the thrust exerted by the viscous liquid on one of the solids of revolution.

The viscosimeter moreover comprises adjustable means for maintaining the liquid under a suitable average pressure, preferably equal to the pressure of the liquid in the apparatus in which it is to be used (bearing for instance) and in any case sufficient for preventing any cavitation phenomenon.

In the case of absolute measurements, the solids are coaxial and preferably of spherical or hemispherical shape.

In the case of spherical solids, the difference of pressure can advantageously be measured between a pole and an equatorial point.

When the viscous liquid is to be subjected to a high average pressure, the necessity of providing fluid-tight stuffing-boxes may be avoided by mounting the internal plunger between pivot pins located in the casing and by producing the relative rotation by means of forces acting by influence (magnetic or electromagnetic fields of force).

Other features of the invention will become apparent from the following description, with reference to the accompanying drawing, in which.

Figure 1:
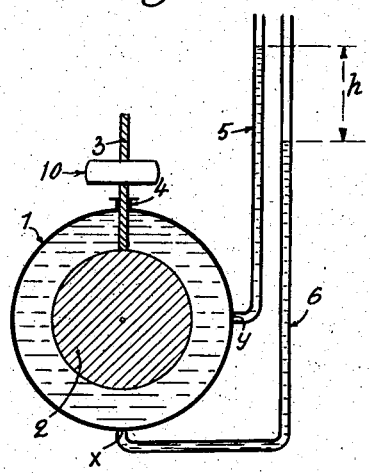
Fig. 1 is a diagrammatical axial sectional view of an embodiment of the invention.

Referring to Fig. 1, the viscosimeter comprises for instance two concentric spheres 1 and 2, the space comprised between the spheres being filled with the liquid to be studied, which is maintained therein under a suitable average pressure, adjustable by any suitable means. Said pressure must be such as to prevent any cavitation in the midst of the liquid, which might, for instance occur if, for a given angular speed, the average pressure were to be insufficient. The latter must be so much the higher as the limiting surfaces are closer, and it must correspond as far as possible to the pressures exerted on the viscous liquid in the machines in which it is to be used.

To sphere 2 is imparted for instance a certain angular speed $w^1$ by means of a shaft 3 extending into spherical casing 1 through a fluid-tight stuffing-box 4 for instance and having a pulley 10 adapted to be driven by any suitable source of power through a belt (not shown). Shaft 3 is driven by a motor (not shown), the rotation of which is strictly constant, preferably a chronometric motor such as the one devised by Professor Amédée Guillet, as described in the reports of the "Académie des Sciences" (vol. No. 160, p. 235). The spheres are preferably provided with polished surfaces, quite clean, inert to the viscous liquid. The angular speed imparted to sphere 2 can be of the order of one revolution per second (or a multiple or sub-multiple) and the spheres can easily be given diameters of the order of the centimeter or the decimeter, the interval comprised between them being of the order of the millimeter or of the centimeter.

Once a stable working speed has been reached, it will be observed, if the speed is sufficiently slow, that the difference of pressure $h$ read for instance on two manometric tubes 5 and 6, or measured by any other suitable means at two points $xy$, such as for instance the pole and an equatorial point of the casing, is proportional to the kinematic viscosity coefficient of Poiseuille $\eta$ and to the angular speed;

$$\eta = k\frac{h}{\omega}$$

Factor $k$ can as a rule be calculated, which allows for effecting absolute measurements, at least in the case of simple geometrical figures.

Figure 2:
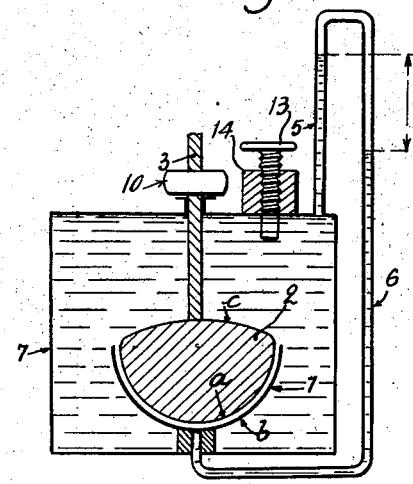
Fig. 2 is a similar view, showing a modification for measuring viscosities under pressure.

The modification illustrated in Fig. 2 offers advantages when the viscosity is to be measured under high average pressures, for instance of the order of magnitude of those existing in machines. In this modification, the surfaces 1 and 2 between which is interposed the viscous liquid, are enclosed within a casing 7 filled with the liquid to be studied, the desired pressures being obtained by a suitable means within the casing, for instance a screw-plunger 13 screwed in a screwthreaded boss 14 of the casing.

The opposite concentric surfaces $a$ and $b$ can be relatively close to each other as compared with the distances to the casing 7 of the other movable parts such as $c$, so that the viscosity effect can be considered as resulting for the greater part from the liquid contained between the adjacent opposite surfaces $a$ and $b$, whereas the effect of the portion of surface $c$, not opposite $b$, and of the casing and its accessories, can be considered negligible, at least for certain correcting terms of higher order.

Figure 3:
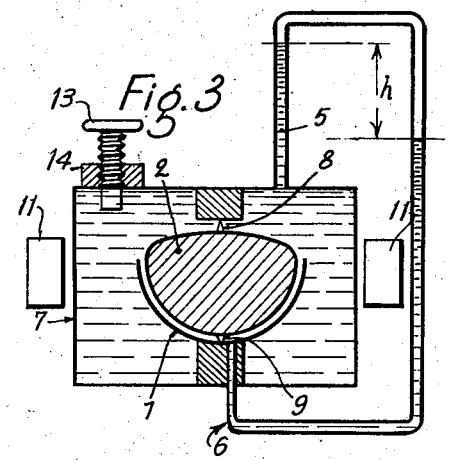
Fig. 3 shows a modification wherein the rotor is driven by influence.

In the case of Fig. 3, the movement of body 2 is not directly controlled by a driving shaft such as 3, but it is mounted between two pivots 8 and 9 and driven by any suitable means, for instance an electromagnetic motor, the polar pieces of said motor being diagrammatically shown at 11, whereas the movable body may be made of magnetic or electrically conducting materials, so as to be driven by influence through wall 7. As in the preceding examples the difference of pressure $h$ is read on the manometric tubes 5 and 6 and the desired pressure in the casing 7 is obtained, for instance, as in Fig. 2, by the screw-plunger 13 screwed in the boss 14 of the casing.

This latter device is particularly advantageous when very high pressures are used, under which stuffing-boxes or similar devices would not properly operate.

Figure 4:
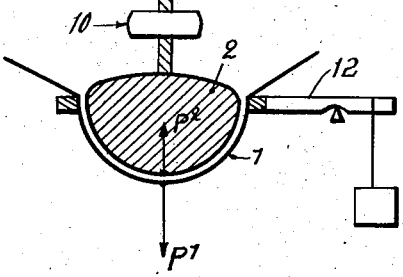
Fig. 4 is a diagrammatic showing where the viscosity is measured by the vertical thrust on the immersed body.

Fig. 4 diagrammatically illustrates an arrangement for carrying out the second measuring method. The opposed members 1 and 2 tend to execute a virtual axial displacement, the thrust $P^1$ or $P^2$ exerted on the vessel 1 or the plunger 3 is measured by any suitable means, one or the other (or both) of said parts having a relative uniform movement of rotation. The thrust can be measured for instance by hanging the vessel from a scale 12, the relative positions being determined beforehand and marked out once for all.

For a sufficiently slow relative rotation, the thrusts in excess P or $P^1$ are proportional to the relative angular speed ω and to the kinematic viscosity coefficient of Poiseuille $$\eta = k' \frac{P(\text{or } P^1)}{\omega}$$

It is to be understood that the various devices herein described will be provided with manometric, thermometric or thermostatic devices in order to maintain or to measure the various physical parameters on which depends the viscosity coefficient.

Having now described my invention what I claim as new and desire to secure by Letters Patent is:

1. A viscosimeter comprising in combination: two members each having a continuous surface, at least one of said members having a surface of revolution about an axis; means for mounting at least one of said members adjacent to, and for rotation relative to, the other member, thereby forming an unobstructed space of substantially uniform thickness between the entire surfaces of said members and adapted to receive a body of liquid; means for imparting to said body of liquid an unobstructed turbulent periodic circulation throughout said entire space, said means comprising driving means for rotating one of said members at a substantially constant, liquid-entraining angular speed about said axis; pressure indicating means communicating with said liquid at at least one point of the peripheral surface of said liquid and perpendicularly to said peripheral surface, one said point being in said space, for measuring the pressure generated by said circulation of said liquid.

2. In a device as claimed in claim 1, an outer container to contain said members and said liquid, and means for maintaining a pressure on said container.

3. A viscosimeter as claimed in claim 1, in which said surface of revolution is substantially spheroidal.

4. A viscosimeter comprising in combination: two members each having a continuous surface, at least one of said members having a surface of revolution, about an axis; means for mounting at least one of said members adjacent to, and for rotation relative to, the other member, thereby forming an unobstructed space of substantially uniform thickness between the entire surfaces of said members and adapted to receive a body of liquid; means for imparting to said body of liquid an unobstructed turbulent periodic circulation throughout said entire space, said means comprising driving means for rotating one of said members at a substantially constant, liquid-entraining angular speed about said axis; pressure indicating means communicating with said liquid at two spaced points of the peripheral surface of said liquid, one of said points being in said space and the communication being perpendicular to the peripheral surface, said points being unequally distant from said axis.

5. A device as claimed in claim 4, in which said two spaced points are located substantially on a meridian plane of said member having a surface of revolution.

6. A device as claimed in claim 4, in which one of said spaced points is located substantially on said axis.

HENRY MARTIAL
DU BOSCQ DE BEAUMONT.

REFERENCES CITED

The following references are of record in the file of this patent:

UNITED STATES PATENTS

| Number | Name | Date |
|---|---|---|
| 793,487 | Wilkens | June 27, 1905 |
| 1,665,933 | Rodman | Apr. 10, 1928 |
| 1,727,836 | Miller | Sept. 10, 1929 |
| 1,810,992 | Dallwitz-Wegner | June 23, 1931 |
| 2,027,903 | Dintilhac | Jan. 14, 1936 |
| 2,074,174 | Goodier | Mar. 16, 1937 |
| 2,344,331 | Swift et al. | Mar. 14, 1944 |

FOREIGN PATENTS

| Number | Country | Date |
|---|---|---|
| 434,994 | Great Britain | Sept. 12, 1935 |